United States Patent
Post

(10) Patent No.: US 7,311,223 B2
(45) Date of Patent: *Dec. 25, 2007

(54) APPARATUS FOR DISPENSING A PLURALITY OF POWDERS AND METHOD OF COMPOUNDING SUBSTANCES

(75) Inventor: Jan H. N. Post, Sassenheim (NL)

(73) Assignee: Fluid Management, Inc., Wheeling, IL (US)

( * ) Notice: Subject to any disclaimer, the term of this patent is extended or adjusted under 35 U.S.C. 154(b) by 273 days.

This patent is subject to a terminal disclaimer.

(21) Appl. No.: 11/100,360

(22) Filed: Apr. 6, 2005

(65) Prior Publication Data

US 2005/0269367 A1 Dec. 8, 2005

Related U.S. Application Data

(63) Continuation-in-part of application No. 10/841,275, filed on May 7, 2004, now Pat. No. 7,134,573.

(51) Int. Cl.
 *G01G 13/00* (2006.01)
 *B67D 5/48* (2006.01)

(52) U.S. Cl. .................. 222/1; 222/77; 222/144; 222/278; 222/281; 222/310; 222/333; 222/413

(58) Field of Classification Search .............. 222/1, 222/77, 144, 236, 241, 255, 265, 270, 273, 222/278, 281, 310, 333, 413
See application file for complete search history.

(56) References Cited

U.S. PATENT DOCUMENTS

| | | | |
|---|---|---|---|
| 3,878,907 A | 4/1975 | Morick | |
| 4,581,704 A | 4/1986 | Mitsukawa | |
| 4,611,921 A * | 9/1986 | Patel | 366/156.1 |
| 4,867,258 A | 9/1989 | Narukawa et al. | |
| 4,913,198 A | 4/1990 | Hayahara et al. | |
| 4,959,947 A | 10/1990 | Reif | |
| 5,006,995 A | 4/1991 | Toschi et al. | |
| 5,031,781 A | 7/1991 | Price et al. | |
| 5,083,591 A | 1/1992 | Edwards et al. | |
| 5,163,010 A | 11/1992 | Klein et al. | |
| 5,163,484 A | 11/1992 | Howlett et al. | |
| 5,203,387 A | 4/1993 | Howlett et al. | |
| 5,268,849 A | 12/1993 | Howlett et al. | |
| 5,328,057 A | 7/1994 | Hellenberg et al. | |

(Continued)

FOREIGN PATENT DOCUMENTS

DE 19728624 1/1998

(Continued)

OTHER PUBLICATIONS

International Search Report dated Feb. 16, 2005.

*Primary Examiner*—Joseph A. Kaufman
(74) *Attorney, Agent, or Firm*—Miller, Mattias & Hull

(57) ABSTRACT

An apparatus for dispensing a plurality of powders, such as colorants for paint, caulking or grout or components of cosmetics, comprising a plurality of containers for holding the powders, a plurality of metering powder pumps, connected to a container or having a connector for releasably connecting a container to the respective powder pump, wherein the capacity of the metering powder pump is selectable.

27 Claims, 5 Drawing Sheets

U.S. PATENT DOCUMENTS

| | | | |
|---|---|---|---|
| 5,348,188 A | 9/1994 | Bohler | |
| 5,348,195 A * | 9/1994 | Pajot | 222/227 |
| 5,365,722 A | 11/1994 | Edwards et al. | |
| 5,390,714 A | 2/1995 | North, III et al. | |
| 5,474,211 A * | 12/1995 | Hellenberg | 222/1 |
| 5,542,572 A | 8/1996 | Davis | |
| 5,622,692 A | 4/1997 | Rigg et al. | |
| 5,632,314 A | 5/1997 | Koppe et al. | |
| 5,647,411 A | 7/1997 | Koppe et al. | |
| 5,690,252 A | 11/1997 | Oleksiewicz et al. | |
| 5,697,527 A | 12/1997 | Altieri, Jr. et al. | |
| 5,711,458 A | 1/1998 | Langeveld et al. | |
| 5,785,960 A | 7/1998 | Rigg et al. | |
| D401,246 S | 11/1998 | Langeveld et al. | |
| 5,903,465 A | 5/1999 | Brown | |
| 5,938,030 A | 8/1999 | Stolz | |
| 5,945,112 A | 8/1999 | Flynn et al. | |
| 5,992,691 A | 11/1999 | Post et al. | |
| 6,003,731 A | 12/1999 | Post et al. | |
| 6,089,538 A | 7/2000 | Shirkhan | |
| 6,168,305 B1 * | 1/2001 | Marmsater | 700/240 |
| 6,193,053 B1 | 2/2001 | Gaalswyk | |
| 6,221,145 B1 | 4/2001 | McClain | |
| 6,273,298 B1 | 8/2001 | Post et al. | |
| 6,398,513 B1 | 6/2002 | Amsler et al. | |
| 6,412,658 B1 | 7/2002 | Bartholomew et al. | |
| D461,080 S | 8/2002 | Bartholomew et al. | |
| D465,810 S | 11/2002 | Bartholomew et al. | |
| 6,510,366 B1 | 1/2003 | Murray et al. | |
| D472,253 S | 3/2003 | Reedy et al. | |
| 6,540,486 B2 | 4/2003 | Amsler et al. | |
| 6,615,881 B2 | 9/2003 | Bartholomew et al. | |
| 6,622,064 B2 | 9/2003 | Bartholomew et al. | |
| D485,310 S | 1/2004 | Bartholomew et al. | |
| 6,672,341 B2 | 1/2004 | Bartholomew et al. | |
| 7,134,573 B2 * | 11/2006 | Post | 222/1 |
| 2001/0047309 A1 | 11/2001 | Bartholomew et al. | |
| 2002/0010528 A1 | 1/2002 | Bartholomew et al. | |
| 2003/0019885 A1 | 1/2003 | Luehrsen et al. | |
| 2003/0060925 A1 | 3/2003 | Bartholomew et al. | |
| 2003/0062379 A1 | 4/2003 | Bartholomew et al. | |
| 2003/0090176 A1 | 5/2003 | Bartholomew et al. | |
| 2003/0230355 A1 | 12/2003 | Bartholomew et al. | |

FOREIGN PATENT DOCUMENTS

| | | |
|---|---|---|
| DE | 29924013 U | 9/2001 |
| EP | 0283137 A1 | 9/1988 |
| EP | 0391286 | 10/1990 |
| EP | 0642464 A4 | 6/1995 |
| EP | 0642464 B1 | 10/1997 |
| EP | 0947699 A1 | 10/1999 |
| EP | 0992450 A1 | 4/2000 |
| EP | 1090679 A1 | 4/2001 |
| EP | 0800858 B1 | 7/2002 |
| EP | 1275433 A1 | 1/2003 |
| EP | 1134186 B1 | 5/2003 |
| EP | 1361185 | 11/2003 |
| EP | 1388365 | 2/2004 |
| EP | 1559652 A1 | 8/2005 |
| FR | 2106944 | 5/1972 |
| FR | 2582912 | 12/1986 |
| GB | 1433710 | 4/1976 |
| GB | 1548965 | 7/1979 |
| GB | 2151362 | 7/1985 |
| JP | 60183028 | 9/1985 |
| WO | 94/21554 | 9/1994 |
| WO | WO-01-75586 A1 | 10/2001 |
| WO | 02/073142 | 9/2002 |
| WO | WO-03-026458 A2 | 4/2003 |
| WO | WO-03/031161 A1 | 4/2003 |
| WO | WO-03/031280 A1 | 4/2003 |
| WO | 03/045542 | 6/2003 |
| WO | 03/084653 | 10/2003 |
| WO | WO-03/083334 A1 | 10/2003 |

* cited by examiner

APPARATUS FOR DISPENSING A PLURALITY OF POWDERS AND METHOD OF COMPOUNDING SUBSTANCES

CROSS REFERENCE TO RELATED APPLICATION

This is a continuation-in-part of application Ser. No. 10/841,275, filed on May 7, 2004, now U.S. Pat. No. 7,134,573.

BACKGROUND

1. Technical Field

An apparatus is disclosed for dispensing a plurality of powders, such as colorants for paint, dye, caulking or grout or components of cosmetics, and to a method of compounding powder substances.

2. Background of the Related Art

A prior art apparatus of this type is disclosed in U.S. published patent application No. 2003/0230355. This document pertains to an interactive cosmetic body powder selection system having a point of sale dispenser. The system includes a cosmetic powder dispenser that contains a plurality of different shades, tints or hues of colors or pigments, which can be dispensed in pre-selected proportions to create a custom color selection. A user-interactive system is provided at a point-of-sale for allowing a user to choose or dispense a color, effect, or both. Information about the selection is employed for dispensing the appropriate proportions of ingredients. Preferably the ingredients are dispensed manually into a powder canister having an integrated brush in fluid communication with the canister. In another embodiment, the system is automated.

U.S. Pat. No. 4,959,947 relates to an apparatus for the production and packaging of a compound mixture, in which extremely accurate and rapid weighing-out, proportioning and packaging of individual components are achieved, is provided. For this, filling stations (4 to 6) are equipped with combined discharge, weighing and transfer devices (22), which allow single-component treatment. In column 4, lines 25 to 32 it is stated that "The first type of filling station 4 (individual vessels 1 to 4) illustrated in FIG. 1 has a discharge device 23 which is composed of two electronically controlled worm conveyors 24 arranged above one another and of an electronically controlled shutoff valve 25. The double worm conveyor serves for matching the proportioning capacity to the material to be conveyed or to the amount to be weighed out from the feed vessel 7."

German Utility Model No. 299 24 013 relates to a metering device for a powder, such as aluminum powder for making cellular concrete, which comprises a relatively large screw for generating a relatively large mass flow and a relatively small screw, which receives material from the relatively large screw.

SUMMARY OF THE DISCLOSURE

An apparatus and a method are disclosed for accurately and quickly dispensing different amounts of powder.

The amounts of the powders can vary over a wide range and the apparatus is of a relatively robust construction.

A disclosed apparatus for dispensing a plurality of powders, such as colorants for paint, caulking or grout or components of cosmetics, comprises a plurality of containers for holding the powders, a plurality of metering powder pumps, connected to a container or having a connector for releasably connecting a container to the respective powder pump, wherein the capacity of the metering powder pump, i.e. the amount dispensed at each revolution (in case of screw pumps) or nominal stroke (in case of a piston pumps), is selectable.

By employing metering pumps of which the capacity is selectable, the time needed for dispensing a particular amount of powder can be reduced and/or the accuracy with which this amount is dispensed can be increased. In other words, it becomes possible to optimize for speed on the one hand and accuracy on the other.

A selectable capacity can be achieved in various ways. For example, by providing a screw pump, which can be tilted so as to lower the outlet opening and thus stimulate the flow of powder, or by providing a screw pump, wherein the screw comprises a helical wire or spring wound about a rod and wherein the effective pitch of the screw and thus the capacity can be increased respectively decreased by elongating respectively shortening the helical wire or spring. It is also possible to employ a conical screw housed in a (horizontal) conical chamber, with the outlet opening at the apex of the conical chamber. By moving the screw, in axial direction, away from or towards the outlet opening, the capacity of the powder pump can be respectively increased or decreased.

However, it is preferred that the metering powder pumps comprise at least two, preferably separated pump mechanisms, one mechanism having a relatively large dispensing capacity and another mechanism having a relatively small dispensing capacity. With such pumps, the amounts to be dispensed may vary over a wide range.

It is further preferred that the disclosed apparatus comprises at least one weighing device for weighing at least one, preferably all of the dispensed amounts.

A disclosed method for compounding substances, such as paints, dyes, caulking or grout or cosmetics, comprises:

providing apparatus comprising a plurality of containers holding powders, a plurality of metering powder pumps, dispensing an amount of powder into a receptacle by means of at least one of the metering powder pumps, and selecting the capacity of this metering powder pump prior to or during the dispensing of that amount.

It is preferred that at least some, preferably all of the metering powder pumps comprise at least two pump mechanisms and that the method further comprises:

dispensing a relatively large part of the said amount by means of one mechanism, and dispensing a relatively small part of the said amount by means of another mechanism.

Optimization of speed and/or accuracy is further facilitated if the said large part is at least ten times larger than the said small part.

The disclosed methods are especially suitable for compounding substances at a point-of-sale or, in case of paint, at a paint shop.

Within the framework of the invention, the term "powder" is defined as particles having a size in a range from 0 to 1500 µm, preferably in a range from 10 to 1000 µm, more preferably in a range from 10 to 500 µm, and at least includes granulates, microgranulates, crystals, frit, grounds, microspheres and the like.

It is noted that the drawings are not necessarily to scale and that details may have been omitted, which are not necessary for understanding the disclosed embodiments. The terms "upper", "lower", "horizontal", "vertical", "front", "rear", and the like relate to the embodiments as oriented in the figures. Further, elements that are at least substantially identical or that perform an at least substantially identical function are denoted by the same numeral.

DETAILED DESCRIPTION OF THE PRESENTLY PREFERRED EMBODIMENTS

Figure 1:
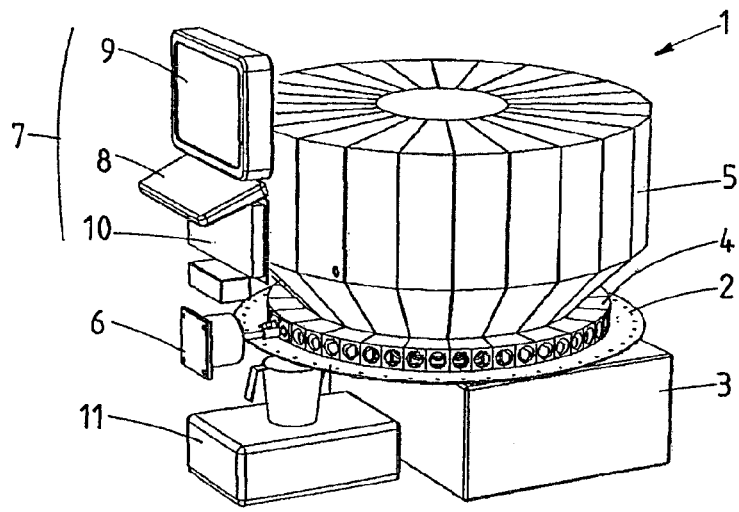
FIG. 1 is a perspective view of a first apparatus for dispensing powders.
Figure 2:
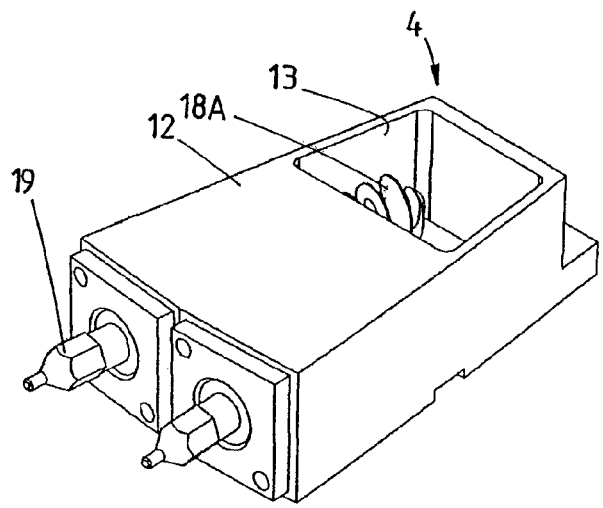
FIG. 2 is a perspective top view of a metering pump used in the apparatus of FIG. 1.

FIGS. 1 and 2 illustrate an example of an apparatus 1 for dispensing a plurality of powders, such as pigments for compounding paints, dyes, caulking or grout or components of cosmetics, e.g. foundations. It can be used for numerous paint or cosmetic recipes and can be located e.g. at a retailer, a spa or at a body repair shop for cars.

This particular dispensing apparatus 1 is an automated version and includes a horizontal turntable 2, mounted on a support 3 and carrying, along its circumference, a plurality of metering powder pumps 4 and twenty-four containers 5 for the powders. The turntable 2 can be rotated about a vertical, central axis by means of a motor inside the support 3 and between discrete positions, in this case forty-eight positions (two for each container as will become apparent below) including a front or dispensing position provided with a stepper motor 6 for driving one of the pumps 4.

The apparatus 1 further comprises a control device 7 comprising a small keyboard 8 for entering information, such as client data and paint recipes, and a display 9. The control device 7 also comprises a computer 10 for storing the said information and for driving the turntable 2 and the stepper motor 6.

A weighing device 11, comprising an upper plate (shown in FIG. 1) on which a cup or other receptacle can be placed and a load-cell (hidden from view and known in itself), is located beneath the pump 4 and the container 5 that are in the dispensing position. Optionally, a dispenser (not shown) for cups or other receptacles can be provided, especially when the apparatus 1 is being employed for dispensing components of cosmetics.

Figure 3:
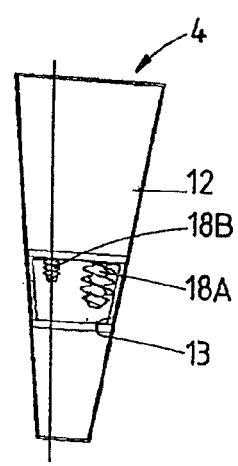
FIG. 3 is a further top view of the said metering pump.

As can be seen in FIGS. 2 and 3, each of the metering pumps 4 comprises a housing 12 having a inlet chamber 13, with an inlet opening facing upwards and positioned beneath a container 5, and a polycylindrical bore (shown in cross-section in FIGS. 4 and 5) leading to an outlet chamber 14 facing downwards and, during dispensing, positioned over a receptacle 15. A lid 16 is pivotably mounted on the housing 12 for closing the outlet chamber 14.

Inserts 17 are mounted, e.g. by means of an external screw thread, in the said channel. These inserts 17 are provided with axially extending pump chambers, which accommodate two concave profile screws 18 of different size and which can be readily replaced, e.g. when a different type or size of screw is to be fitted.

In this example, the screws 18 extend radially with respect to the turntable 2. The relatively large screw 18A has a diameter of 22 mm and a double pitch of 12 mm, yielding a dispensed volume for each revolution of 735 mm$^3$, whereas the relatively small screw 18B has a diameter of 8.5 mm and a double pitch of 7 mm, yielding a dispensed volume for each revolution of 35 mm$^3$. First ends of the screws 18, extending away from the central vertical axis of the turntable 2, are each provided with an adaptor 19 which is to be engaged by the stepper motor 6, as will be explained in more detail below. Further, each of the screws 18 is made of polypropylene (PP) or polytetrafluoroethylene (PTFE) reinforced with a cylindrical metal rod 20.

In order to further improve the dispensing accuracy of the screws 18, the effective outer diameter of the screws 18 is in excess of the effective inner diameter the respective chamber. The rim of the screw is at least partially bent in the displacement direction of the pump. Such bending can be achieved by simply inserting the oversized screws in the channels from the outlet side towards in the inlet side.

In an alternative embodiment, which is especially suitable for fragile powders, the effective outer diameter of the screw is smaller than the effective inner diameter of the respective chamber, resulting in clearance between the screw and the chamber, and wherein the screw is provided with bristles that bridge this clearance. This type of screw was found to be effective in reducing the forces exerted on the powder.

Figure 4:
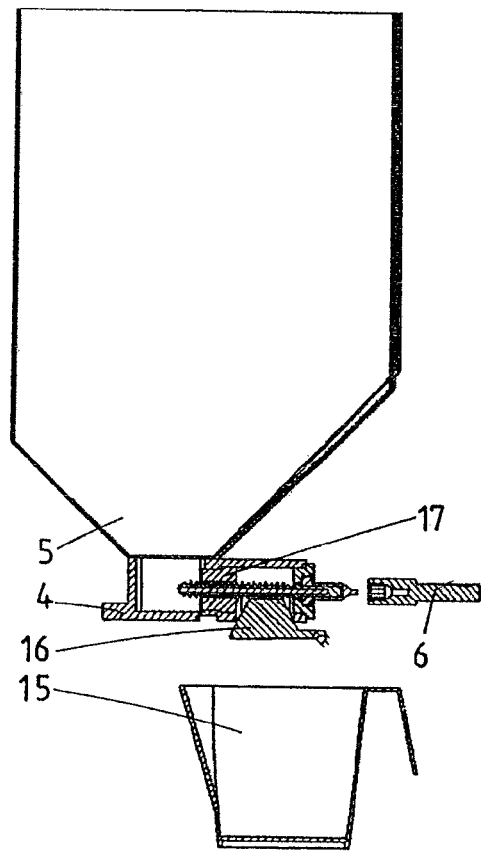
FIGS. 4 and 5 are cross-sectional side views of a container and metering pump used in the apparatus of FIG. 1.
Figure 5:
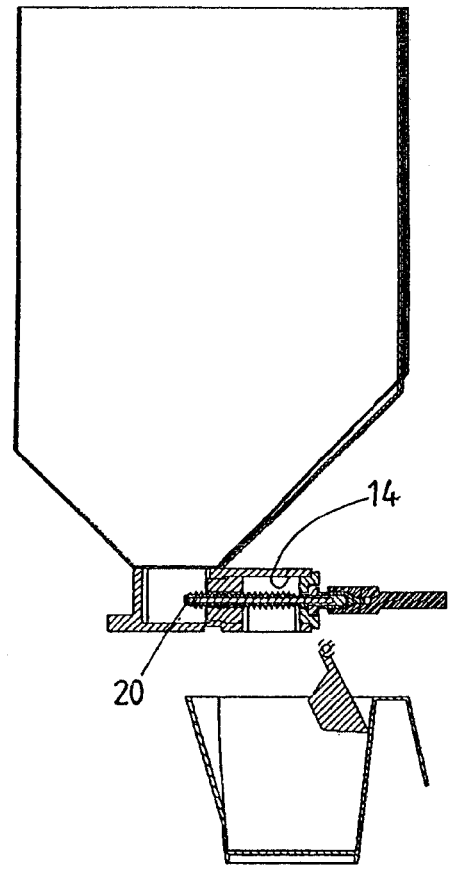

As illustrated in FIGS. 4 and 5, during the dispensing of a particular recipe, e.g. consisting just of powders to be dispensed and mixed in a cup or consisting of a base material into which one or more powders should be dispensed, the turntable 2 is rotated about its vertical axis until the container 5 with the required powder is in the dispensing position. Subsequently, the lid 16 is opened (See FIG. 5) and, depending on the amount to be dispensed, the large screw 18A, which a particular powder having a density of, say, 0.57 g/cm$^3$ dispenses 0.42 g for each revolution, or the small screw 18B, which dispenses 20 mg for each revolution, is selected. For example, if 84.36 g is to be dispensed, the large screw 18A is positioned in front of the stepper motor 6, engaged by the same, and driven to completed 200 turns. Subsequently, the small screw 18B is positioned in front of the stepper motor 6, engaged by the same, and driven to complete 18 turns, yielding the required amount.

In another example, employing the weighing device 11, if the screws have an accuracy of 2%, 96% of the required amount is dispensed by the large screw 18A and the dispensed amount is checked by the weighing device 11. If it is established that e.g. 97% of the required amount has been dispensed, the large screw 18A is driven to dispense a total of 99% and the remaining part is dispensed by means of the small screw 18B.

The accuracy of the screws can be further enhanced by calibrating, relative to a reference or zero position of the screw, the dispensed amounted in several positions within one revolution, e.g. for each step of 30 degrees yielding a total of 12 steps in one revolution. By calibrating for several positions, any non-linear effects can be take into account. These effects dependent inter alia on the dimensions and material of the screw and on the powder that is being dispensed. In some cases, the screw will dispense relatively small amounts or not dispense at all during e.g. two or three steps and then dispense a relatively large amount in the fourth step, which phenomenon could be referred to as "pulsing". Many of these effects were found to be sufficiently regular to allow compensation by calibration.

In addition to use during dispensing, the above-described weighing device 11 can also be used to calibrate one or more of the pumps.

Once dispensing of a particular powder has been completed, the lid 16 is closed and the turntable 2 is rotated until the next required container 5 is in the dispensing position. Closing the lid 16 prevents powder from falling out during rotation. In an alternative embodiment, the screws that have just been used are revolved in reverse direction prior to rotation of the turntable thus drawing the powder back into the metering powder pump.

With the above described apparatus and method dispensing it is possible to relatively accurately and quickly dispense amounts ranging from e.g. 10 milligram to 500 gram.

Figures 6, 7:
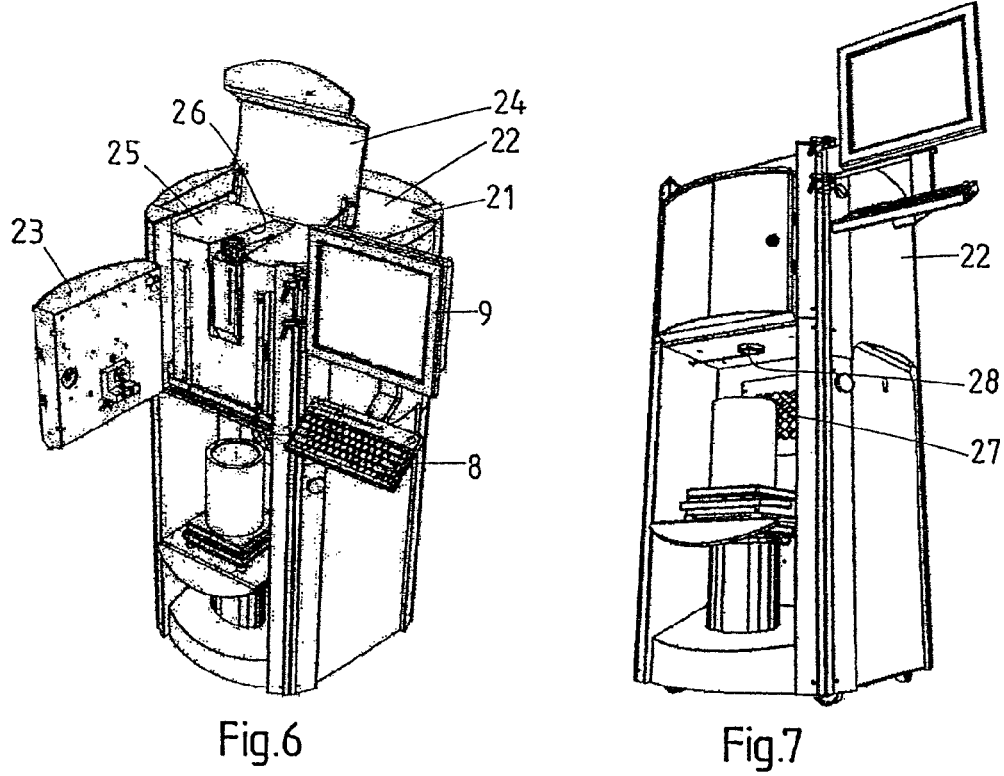
FIGS. 6 and 7 are perspective views of a second apparatus for dispensing powders comprising several additional features.

FIGS. 6 and 7 show a second embodiment of an apparatus for dispensing powders comprising several additional features. This second embodiment comprises substantially the same components as the embodiment described above, including a horizontal turntable 2 (best shown in FIG. 10A), with a plurality, in this example twenty-four, metering pumps 4 (best shown in FIGS. 9A and 9B) and containers 5a, mounted along its circumference. The turntable 2 can be rotated between discrete positions, in this example, forty-eight positions including a front or dispensing position (marked in FIG. 6 by a single exposed container), about a vertical, central axis by means of a drive (not shown). The apparatus 1 includes a frame of e.g. aluminium extrusion profiles 21 to which sheets 22 of metal or a polymer (transparent, translucent or opaque) have been attached by means of e.g. screws. A control device 7 comprising a display 9 and a keyboard 8 for entering information, such as customer data and recipes, is mounted on the right hand side of the frame, next to a door 23. This door 23 contains a computer (10) for storing the said information and for driving the turntable 2, actuators, including a stepper motor 6, for operating the pumps 4, etc. A weighing device 11 is positioned below the door 23 in a recess where a cup or the like for receiving powders dispensed by the apparatus 1 can be placed.

A substantially rectangular hatch 24 is pivotally mounted, along one of its rims, in the top sheet 22. Further, a metal coversheet 25 is present below the hatch 24. The coversheet 25 comprises an opening 26 that corresponds in shape to the shape of the containers and which consequently allows access to only one container 4 at a time.

A ventilation unit is located below the turntable, which comprises a grille 27 and which will remove airborne powder. Further, an ionisation device 28 (e.g. a Static Eliminator AD1683EX, available from A&D Company, Ltd., Tokyo, Japan) is provided near, preferably around the dispensing opening of the pump 3 of the container 4 in the dispensing position. This ionisation device 28 serves to reduce or even neutralise electrostatic charges in the material that is being dispensed, thus preventing this material from e.g. adhering to the pump or other parts of the dispenser and improving the accuracy with which the powder is dispensed.

Figures 8A, 8B, 8C:
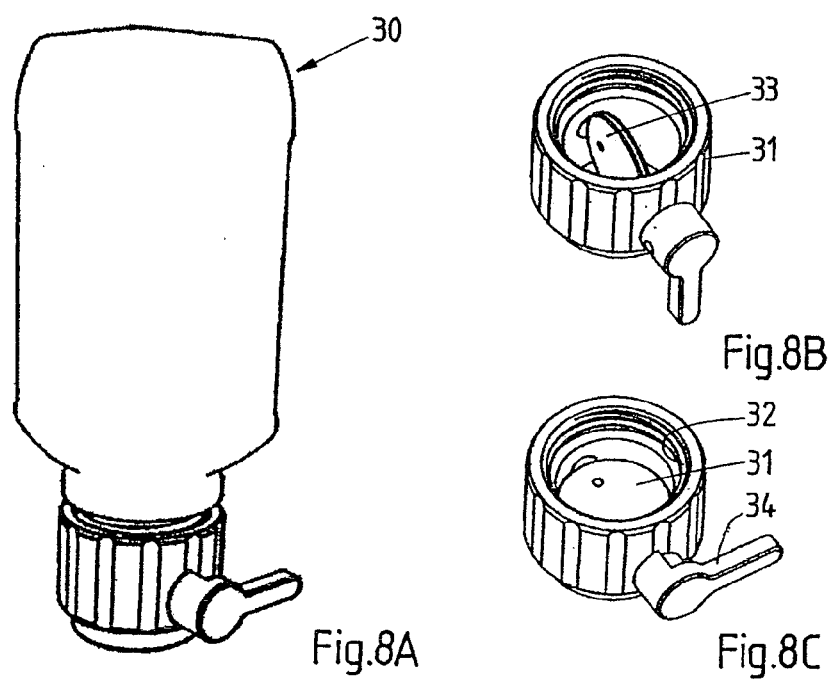
FIGS. 8A to 8C are perspective views of a refill container and a valve for use in the same.

FIGS. 8A to 8C show a refill container 30 and cap 31 comprising a valve. On one end, the cap 31 comprises an internal thread 32, with which the cap 31 can be screwed on top of the refill container 30. On the other end, the cap 31 is adapted to the shape of the fill opening of the containers 4. A valve member, in this example a disc 33 that can be rotated by means of a lever 34, is mounted inside the cap 31.

During the refilling of one of the containers 4, information identifying a particular refill container 30 is inputted into the computer, e.g. by reading a barcode or a radio frequency identification (RF-ID) tag on the refill bottle, and the corresponding container 4 is rotated to the dispensing position and becomes accessible through the opening 26 in the coversheet 25. Subsequently, the container 4 is opened, the refill container 30 is placed on top of the fill opening of the container 4, and the valve 33 is opened by rotating the lever 34. Once the container 4 is filled and/or the refill container 30 is emptied, the valve 33 is closed and the refill container 30 is removed.

In this procedure, the risk of filling a container with a wrong powder and the risk of contamination by the powder are reduced significantly. For the sake of completeness, it is noted that the coversheet 25 and the refill container 30, respectively, provide the same advantages in dispensers and containers for other media, such as liquids and pastes.

Figures 9A, 9B:
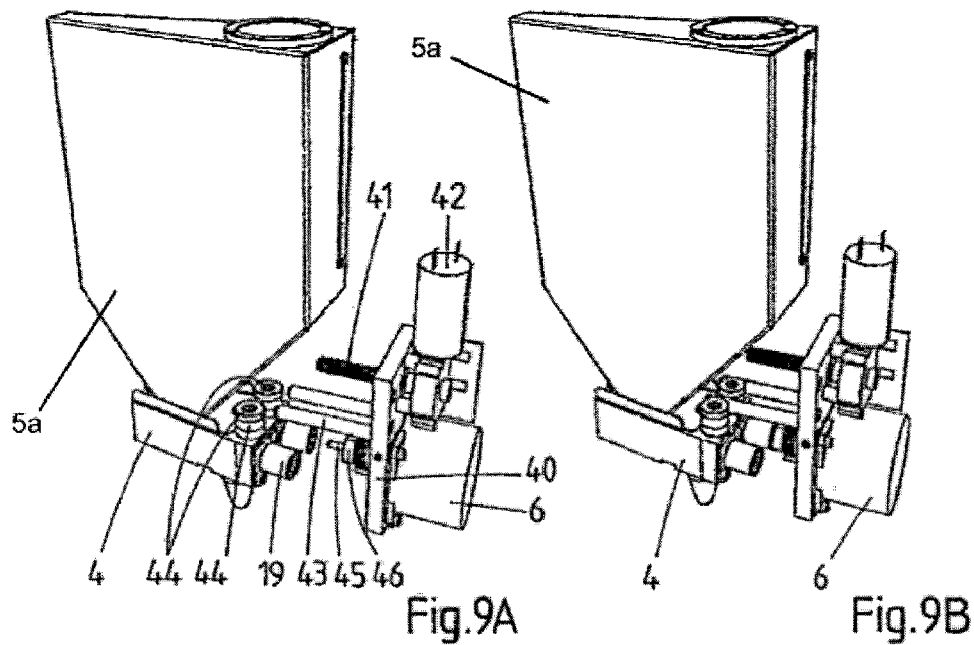
FIGS. 9A and 9B show perspective views of a presently preferred coupling system.
Figure 10A:
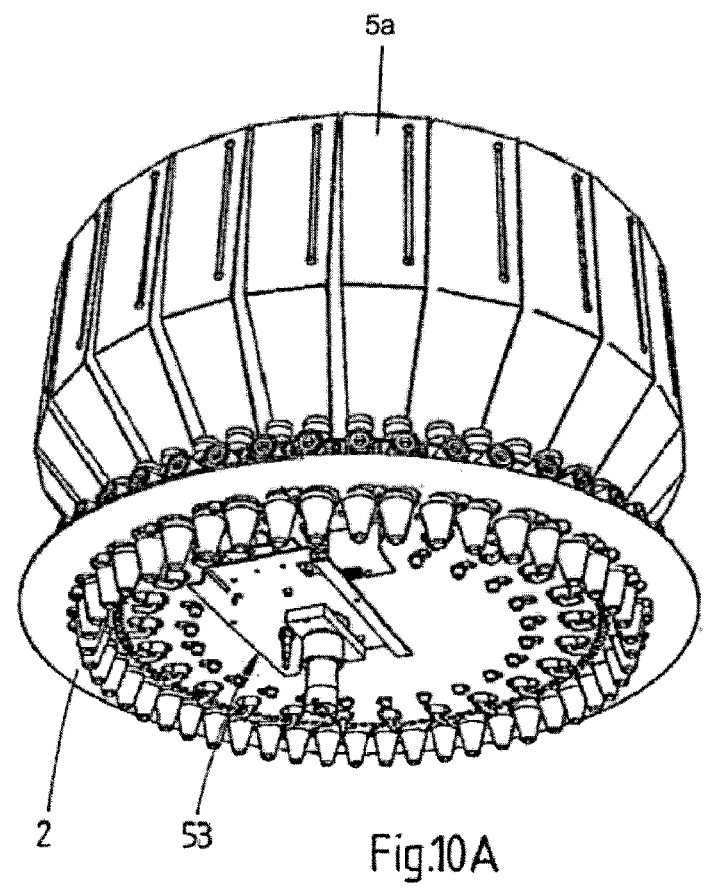
FIGS. 10A to 10D show two perspective views and two side views of a stirring system.
Figure 10B:
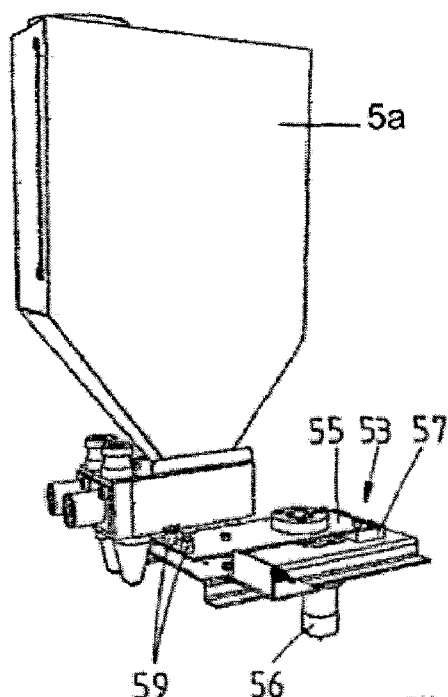

FIGS. 9A and 9B show perspective views of a presently preferred coupling system comprising a support plate 40, which can be moved back and forth with respect to the door (23) and the container 4 in the dispensing position by means of a spindle 41 driven by a (further) motor 42 and running through an element (not shown) that is fixed to the frame.

To facilitate alignment of the driver 6 and the pump 4 that is located at the dispensing position, the coupling system comprises a pair of pins 43 fixed to the support plate 40 and a pair of resilient bushings 44, one for each adaptor 19 to be engaged by the pins 43. The bushings 44 are preferably made of a thermoplastic polymer or a rubber and comprise an annular recess 45 for guiding the pins 43. Further, to compensate for minor misalignments, the driver 6 engages the adaptor 19 by means of a pin 45 that has been mounted on a resilient connector 46. In this example, the resilience of the connector 46 has been obtained by a series of staggered lateral cuts, which extend to the central axis of the connector.

FIGS. 10A to 10D show a preferred system for stirring the contents of one or more, preferably all of the containers 4. In this example, the system comprises, for each of the containers 4, a stirrer 50 having a shaft 51 rotatably mounted in the bottom wall of the respective container 4 and through the pump 3 beneath. The section of the shaft 51 that is inside the container 4 comprises stirring elements, such as flexible rods 52A resting on the inner wall of the respective container (see FIG. 10C) or rigid rods 52B shaped to encompass a substantial part of the volume of the respective container 4 (see FIG. 10D). The end of the shaft 51 is provided with a means for engaging a drive mechanism 53 attached to the frame of the apparatus 1 and located beneath the dispensing position.

In this example, the end of the shaft 51 comprises a hook 54, whereas the drive mechanism 53 comprises a plate 55, a motor 56, guides 57 for supporting a rotational motion of the plate 55, and an alignment ramp 58 located next to (and upstream from) the plate 55. The plate 55 is provided with a pair of studs 59 for engaging the hook 54. During operation, the containers 4 will be rotated about the central axis of the apparatus 1 and the hooks 54 of the containers 4 will pass along and, if directed away from the central axis, be aligned. When the required container 4 has reached the dispensing position, the containers 4 are brought to a halt and the plate 5 of the drive mechanism 53 is rotated. During rotation the studs 59 will engage the hook 54, the shaft 51 of the stirrer 50 will be rotated thus stirring the powder inside the container 4.

Figures 10C, 10D:
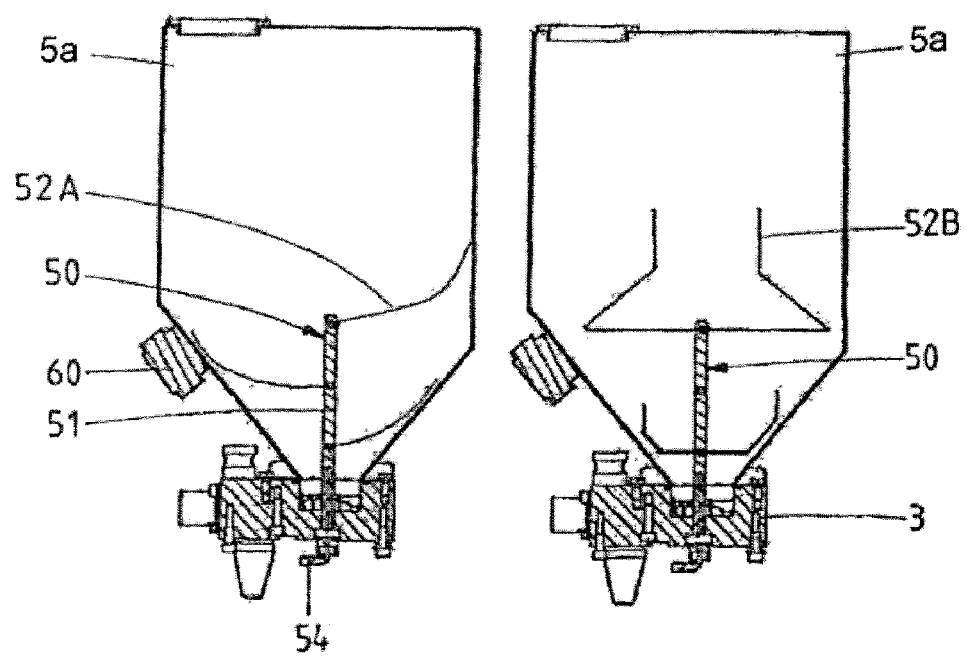

Stirring improves the accuracy with which the powder can be dispensed. Instead of or in addition to stirring, the powder in the containers can be agitated by other means, such as a vibration device 60 attached to the wall of the containers, as shown in FIGS. 10C and 10D. Variations in column pressure, which may also be detrimental to accuracy, can be reduced by means of a pressure divider positioned over the inlet of respective pumps.

As a matter of course, this disclosure is not restricted to the above-disclosed embodiments, which may be varied in different manners within the spirit and scope of the invention. For example, the disclosed apparatuses can be configured as a linear dispensing apparatus i.e. with the containers aligned is a row. Also, the disclosed apparatuses may comprise at least one container for a liquid and a metering liquid pump connected to that container.

What is claimed is:

1. An apparatus for dispensing a plurality of materials comprising:
    a plurality of containers for holding the materials, a plurality of pumps, each pump connected to a container or having a connector for releasably connecting a container to the respective pump, wherein at least some of the pumps comprise a pump chamber housing at least two pump screws including one screw having a relatively large dispensing capacity and another screw having a relatively small dispensing capacity, the pump chamber being in communication with its respective container thereby making the capacities of at least some of the pumps selectable.

2. The apparatus of claim 1, wherein each pump screw is accommodated in a pump chamber.

3. The apparatus of claim 2, wherein at least some of the pump screws are at least partially bent in a displacement direction of its respective pump.

4. The apparatus of to claim 2, wherein an effective outer diameter of the screw is smaller than the effective inner diameter of the respective chamber, resulting in clearance between the screw and chamber, and wherein the screw is provided with bristles that bridge this clearance.

5. The apparatus of claim 1, which comprises a dispensing position common to each pump and wherein a driver for engaging each pump that is located at the dispensing position.

6. The apparatus of claim 5, comprising a coupling mechanism for facilitating alignment of the driver and the pump that is located at the dispensing position.

7. The apparatus according to claim 6, wherein the coupling mechanism comprises a pair of pins associated with each pump and with the driver, and a protrusion to be engaged by the pins associated with, respectively, the driver and each pump.

8. The apparatus according to claim 7, wherein the protrusion comprises a resilient bushing having a recess for guiding the pins.

9. The apparatus according to claim 5, wherein the driver comprises a stepper motor.

10. The apparatus of claim 1, wherein one or more of the containers comprise a stirring mechanism.

11. The apparatus of claim 10, wherein at least one of the stirring mechanisms comprises a stirring element mounted rotatably inside a container.

12. The apparatus of claim 11, which comprises a dispensing position common to all containers and a driver for engaging the stirring mechanism of the container that is located at the dispensing position.

13. The apparatus of claim 1, which is arranged to dispense any amount in a range from 10 mg to 1 g.

14. The apparatus according to claim 1, comprising at least one weighing device for weighing at least one of the dispensed amounts.

15. The apparatus according to claim 1, which further comprises at least one container for a liquid and a liquid pump connected to that container.

16. The apparatus according to claim 1, wherein the pump screws comprise at least one material selected from the group consisting of a polypropylene, a polyethylene and polytetrafluoroethylene.

17. The apparatus of claim 1, further comprising a cover that restricts access one or more of the containers.

18. A method of calibrating the apparatus of claim 1, comprising:
    rotating one of the pump screws through several positions within one revolution of the screw, thus dispensing an amount of the powder for each position,
    weighing the amount of powder dispensed at each position of the screw, and
    providing a memory and storing the measured amounts for each position.

19. The apparatus of claim 1, wherein at least one large pump screw and at least one small pump screw are connected to two different containers, each holding a like material, wherein the large pump screw is connected to one container and the small pump screw is connected to the other container.

20. A method of compounding substances comprising:
    providing an apparatus comprising a plurality of containers, each container holding a material, the apparatus also comprising a plurality of pumps and at least one motor, each pump linked to one of the containers, wherein at least some of the pumps comprise at least two pump screws including a first pump screw having a relatively large dispensing capacity and a second pump screw having a relatively small dispensing capacity, thereby making the capacities of at least some of the pumps selectable,
    dispensing a first amount of material into a receptacle by means of a first pump screw of a selected pump,
    weighing a first amount of material dispensed into the receptacle,
    comparing the first amount dispensed with a desired amount and calculating a first difference,
    dispensing a second amount into the receptacle using the small pump screw of the selected pump,
    weighing the second amount of material dispensed into the receptacle,
    comparing the second amount with the first difference and calculating a second difference,
    using at least the second difference to adjust operation of the motor for said pump in future dispenses.

21. The method of claim 20, further comprising:
    dispensing a relatively large part of the said amount by means of the first pump screw, and
    dispensing a relatively small part of the said amount by means of the second pump screw.

22. The method of claim 21, wherein the the first pump screw is at least ten times larger in capacity than a second pump screw.

23. The method of claim 20, wherein the weight of each of the materials is measured individually.

24. The method of claim 20, wherein at least one material is dispensed as a base material, such as a base paint.

25. The method of claim 20, wherein the substances are compounded at a point-of-sale.

26. A method of dispensing a plurality of ingredients utilizing individually controlled dispense pumps drawing materials from separate material containers, the pumps positioned to dispense to a common receptacle with a weighing device associated with the receptacle and a computer controlling operation of the pumps, each pump comprising a large pump screw and a small pump screw, the method comprising:

determining a first amount of material to be dispensed into the container, operating a large pump screw of a selected pump to draw a first amount of material from said container and dispensing first amount to said receptacle in accordance with a first program stored on said computer which relates a parameter of the large pump screw operation, weighing an actual amount dispensed to said receptacle, comparing the actual amount to the first amount, determining a first difference between the actual and first amounts, operating the small pump screw of the selected pump to move the first difference between the actual and first amounts of said material to said receptacle in accordance with a second program stored on said computer which relates to a parameter of the small pump screw operation, weighing a second actual amount dispensed to said receptacle, comparing the second actual amount to the first difference, determining a second difference between the first difference and second actual amounts to provide a deviation determination for the large small screw, utilizing said deviation determination for the small pump screw as a modifier for future dispenses from said container to said receptacle through controlled operation of the large small screw of said selected pump, selecting a second pump and a second ingredient to be dispensed and repeating the operating, weighing, comparing, determining and utilizing for said second pump.

27. A method of compounding cosmetics formulations comprising:

providing an apparatus comprising a plurality of containers holding materials, and a plurality of pumps, at least one pump comprising a large pump screw and a small pump screw that are linked to a large orifice and a small orifice respectfully, dispensing a first amount of one of the materials into a receptacle by means of the large pump screw through the large orifice, weighing the dispensed amount, comparing the dispensed amount with predetermined desired amount, using a difference between the dispensed amount and the desired amount to calculate new amount to be dispensed and operating the small pump screw to dispense the new amount through the small orifice.

* * * * *